Aug. 31, 1926.
W. M. DANN
1,597,771
TRANSFORMER COOLING SYSTEM
Filed May 11, 1921
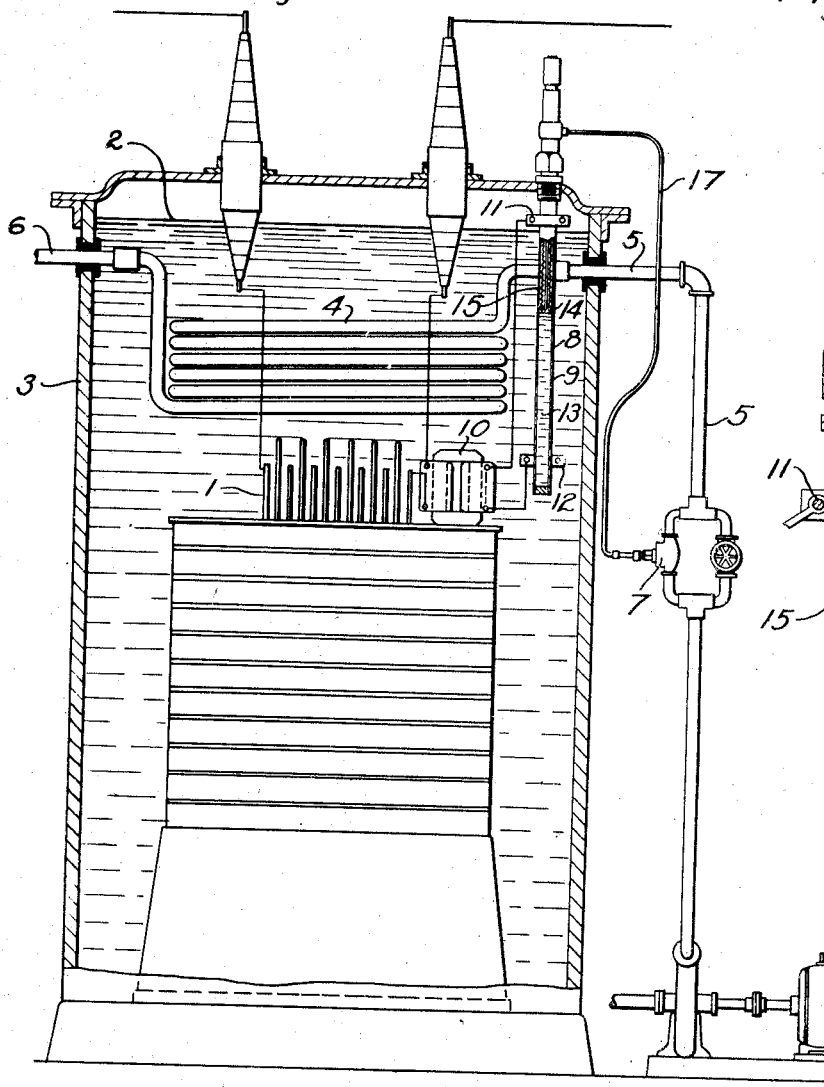
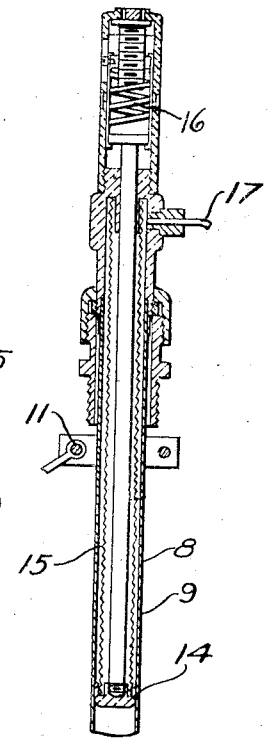
WITNESSES:
L. F. Sonnemann.
Marshall Low
INVENTOR
Walter M. Dann
BY
Charley G. Carr
ATTORNEY Patented Aug. 31, 1926.

1,597,771

UNITED STATES PATENT OFFICE.

WALTER M. DANN, OF WILKINSBURG, PENNSYLVANIA, ASSIGNOR TO WESTINGHOUSE ELECTRIC & MANUFACTURING COMPANY, A CORPORATION OF PENNSYLVANIA.

TRANSFORMER-COOLING SYSTEM.

Application filed May 11, 1921. Serial No. 468,717.

My invention relates to transformer cooling systems and it has particular relation to temperature actuated devices for regulating the flow of the cooling medium.

Heretofore, it has been customary, in certain instances, to control the flow of cooling medium through the cooling coils by means of a thermostat normally submerged within the primary cooling fluid of a transformer. In such devices, the thermostat was operatively connected to a valve that controlled the flow of the secondary cooling medium through the cooling coils. Upon a rise in the temperature of the primary cooling medium, the thermostat would automatically open the valve to increase the flow of the secondary cooling medium circulating within the coils, thereby lowering the temperature of the primary medium within which the cooling coils and the thermostat are submerged. Such arrangement would automatically maintain the primary cooling medium at a predetermined constant temperature.

It has been observed, however, that, in the event of an overload, the heat generated in the transformer windings is not transmitted to the thermostat through the medium of the surrounding cooling fluid with sufficient rapidity to actuate the valve and effect an increased flow of the secondary cooling medium to prevent an excessively high temperature from occurring in the vicinity of the windings. That is to say, the heat generated is more or less localized in the vicinity of the windings and, while a relatively high temperature may exist adjacent thereto, a relatively low temperature may exist in the vicinity of the thermostat.

Before the temperature of the primary cooling medium adjacent to the thermostat becomes sufficiently high to actuate the valve, the temperature surrounding the windings may have become high enough to damage the windings and insulation on account of the relatively slow circulation of the convection currents in the primary cooling medium.

One of the objects of my invention is to provide a thermostat that will respond immediately to the rise or fall of the temperature of the main windings of the transformer, without depending entirely upon the action of the convection currents of the primary cooling medium, as previously set forth.

Another object of my invention is to provide a device of the character described that may be so electrically connected to the main windings of a transformer that the flow of current therethrough will be proportional to that flowing in the main windings.

A further object is to provide a device of the class described that is simple in construction and operation and that may be quickly and easily installed in connection with a transformer-cooling system.

In the accompanying drawing:—

Figure 1 is a vertical longitudinal sectional view through a transformer tank illustrating the main windings, cooling coils and control mechanism therefor in elevation, part of the thermostat being broken away to better illustrate the construction thereof.

Fig. 2 is a vertical longitudinal sectional view through a portion of the thermostat.

Referring to the drawings, a transformer or other electrical apparatus is illustrated as comprising a plurality of main windings 1, normally submerged in a primary cooling fluid 2 contained in a tank 3. A coil or pipe 4, through which a secondary cooling fluid is adapted to be circulated is suitably supported within the tank 3 and is also submerged in the primary cooling fluid 2. Pipes 5 and 6 conduct a secondary cooling medium to the coil 4 from a suitable source of supply, not shown. A suitable valve 7 is located in the pipe 5 by means of which the flow of the cooling fluid to the coil 4 may be regulated or shut off entirely.

The valve 7 is actuated by means of a thermostat 8 normally submerged within the primary cooling medium of the transformer. For the purpose of illustration, the thermostat 8 comprises a tube 9 of high-resistance metal, such as Monel metal, which is electrically connected to the main windings of the transformer, through the medium of a series transformer 10, by means of binding posts or terminals 11 and 12, respectively, located at each end of the tube. The tube 9 is filled with a suitable fluid 13 that is adapted to expand or contract in response to changes of temperature of the tube or of the surrounding fluid. A plunger or piston 14 is movably mounted within the tube 9 and is adapted to be raised upon the expansion of the fluid 13.

A resilient member 15, illustrated as comprising a corrugated collapsible member or tombac tube, maintains the plunger 14 in a depressed position and in contact with the surface of the fluid 13. The compression exerted by the member may be adjusted in any preferred manner, as by means of a set-screw controlled spring 16 in engagement with the piston 14, to vary the temperature at which the thermostat may actuate the valve 7. The fluid 13 within the cylinder 15 extends into a pipe 17 which is suitably connected to the thermostat 8 and is adapted to actuate the valve 7 in a well known manner.

When a current flows through the main windings of the transformer, a smaller current that is proportional to the main current will be caused to flow through the walls of the tube 9 through the agency of the series transformer 10. The resistance, however, of the metal of the cylinder causes the temperature thereof to rise, thereby causing the fluid 13 to expand and to actuate the plunger 14. The vertical movement of the plunger 14 forces the fluid 13 through the pipe 17 and opens the valve 7 sufficiently to increase the flow of the secondary cooling medium through the pipe 5 and coil 4.

It will be apparent that the thermostat will actuate the valve 7 immediately upon an increased flow of current in the main windings of the transformer without waiting for the primary cooling medium, which surrounds the windings, to transmit the heat caused by such increase of current flow.

I claim as my invention:—

1. A cooling system for electrical apparatus comprising a tank adapted to contain a primary cooling medium, an electrical device adapted to be normally submerged within said cooling medium, a coil adapted to be submerged within said medium and through which a secondary cooling medium is adapted to be circulated, a valve for controlling the flow of the secondary cooling medium through said coil, and a thermostat submerged within said primary cooling medium for actuating said valve, said thermostat comprising a tube of high-resistance metal electrically connected to said electrical device.

2. The combination with an electrical translating device, a fluid insulating medium in which said device is immersed, and a conductor for said device, of a device comprising a container immersed in said insulating medium, a thermo-expansive fluid in said container and means electrically connected to said conductor and to said container.

3. The combination with an electrical translating device comprising a conductor and a fluid insulating medium, in which said device is immersed, of a device comprising a container immersed in said insulating medium, a thermo-expansive fluid in said container, and means for causing an electrical current to traverse said container that is proportional to that traversing said conductor.

4. The combination with an electrical translating device comprising a conductor and a fluid insulating medium in which said device is immersed, of a device comprising a container immersed in said insulating medium, a thermo-expansive fluid in said container, means in circuit with said conductor for causing an electrical current to traverse said container, and a movable member actuated in accordance with the variations in the volume of said thermo-expansive fluid.

In testimony whereof, I have hereunto subscribed my name this 25th day of April 1921.

WALTER M. DANN.